US008360274B2

(12) United States Patent
Shen et al.

(10) Patent No.: US 8,360,274 B2
(45) Date of Patent: Jan. 29, 2013

(54) NEGATIVE PRESSURE TYPE MEDICATION DELIVERING DEVICE AND MEDICATION DISPENSING DEVICE AND SYSTEM USING THE SAME

(75) Inventors: Te-Yang Shen, Taoyuan (TW); Chung-Chu Chen, Jhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/161,664

(22) Filed: Jun. 16, 2011

(65) Prior Publication Data

US 2011/0245966 A1 Oct. 6, 2011

Related U.S. Application Data

(62) Division of application No. 11/964,976, filed on Dec. 27, 2007, now abandoned.

(30) Foreign Application Priority Data

Sep. 11, 2007 (TW) ............................... 96133953 A

(51) Int. Cl.

*B65G 59/04* (2006.01)
*B65H 3/08* (2006.01)
*B65H 3/28* (2006.01)
*G07F 11/10* (2006.01)

(52) U.S. Cl. ........ 221/211; 221/221; 221/131; 221/194; 221/195; 221/289; 221/278; 221/126; 221/127; 221/2; 221/9; 221/123; 221/7; 294/64.3; 294/64.1; 271/90; 271/107; 271/11

(58) Field of Classification Search .................. 221/221, 221/211, 131, 194, 195, 289, 278, 126, 127, 221/2, 9, 123, 7; 294/64.3, 64.1; 271/90, 271/107, 11

See application file for complete search history.

(56) References Cited

U.S. PATENT DOCUMENTS 4,759,537 A * 7/1988 Illig et al. ........................ 271/11

(Continued)

FOREIGN PATENT DOCUMENTS

CN 2824907 10/2006
TW 200509883 3/2005

(Continued)

OTHER PUBLICATIONS

English translation of abstract of CN 2824907.

(Continued)

*Primary Examiner* — Gene O. Crawford
*Assistant Examiner* — Rakesh Kumar
(74) *Attorney, Agent, or Firm* — McClure, Qualey & Rodack, LLP

(57) ABSTRACT

A medication delivering device includes a delivering unit and a negative pressure unit. The delivering unit includes a cylinder, a retractable part and a tip element. The cylinder has a first opening and a second opening. The retractable part connects the cylinder with the tip element. The tip element has a first end, a second end and a channel. The first end passes through the first opening and is received within the cylinder. The second end is located at an outlet of a pill container. The channel penetrates from the first end to the second end to link with the interior of the cylinder. The negative pressure unit connects to the second opening for providing negative pressure to the interior of the cylinder and the channel of the tip element, so that the tip element sucks up a pill on the outlet of the pill container.

19 Claims, 10 Drawing Sheets

U.S. PATENT DOCUMENTS

| | | | | |
|---|---|---|---|---|
| 5,490,610 | A * | 2/1996 | Pearson | 221/2 |
| 5,562,232 | A * | 10/1996 | Pearson | 221/7 |
| 5,571,258 | A * | 11/1996 | Pearson | 221/211 |
| RE35,743 | E | 3/1998 | Pearson | |
| 5,787,825 | A * | 8/1998 | Yaji et al. | 111/174 |
| 5,946,883 | A | 9/1999 | Yuyama et al. | |
| 6,253,955 | B1 * | 7/2001 | Bower | 221/150 R |
| 6,263,257 | B1 | 7/2001 | Aemmer | |
| 6,263,259 | B1 | 7/2001 | Bartur | |
| 6,330,957 | B1 | 12/2001 | Bell-Greenstreet | |
| 6,385,943 | B2 | 5/2002 | Yuyama et al. | |
| 7,014,185 | B2 * | 3/2006 | Ostreicher et al. | 271/90 |
| 2006/0124655 | A1 | 6/2006 | Ratnakar | |
| 2006/0213921 | A1 | 9/2006 | Abdulhay et al. | |

FOREIGN PATENT DOCUMENTS

| | | |
|---|---|---|
| WO | 2006102409 | 9/2006 |

OTHER PUBLICATIONS

English translation of abstract of TW 200509883.

* cited by examiner

NEGATIVE PRESSURE TYPE MEDICATION DELIVERING DEVICE AND MEDICATION DISPENSING DEVICE AND SYSTEM USING THE SAME

This application is a divisional application of co-pending application Ser. No. 11/964,976, filed Dec. 27, 2007, which claims the priority benefit of Taiwan application Serial No. 96133953, filed Sep. 11, 2007, the contents of which are incorporated herein by reference.

BACKGROUND OF THE INVENTION

1. Field of the Invention

The invention relates in general to a medication delivering device and medication dispensing device and system using the same, and more particularly to a negative pressure type medication delivering device and medication dispensing device and system using the same.

2. Description of the Related Art

In recent years, there have been remarkable advancements in medical and biotechnological research. Also, people have put more emphasis on daily health care and are concerned with the health care system, and the pharmacological industry has developed very rapidly. From the high cost of prescription medicines, patent medicines, and nutritional supplements (vitamins, minerals, and vegetation nutriments), medication products play an important role in people's daily lives.

Due to the lack of precise and reliable devices for recording a patient's medicine taking history and determining if the timing, dose and variety of the medicine taken by the patient are correct, although every medication company keeps developing new medicines, the clinical result may not be as desired. Also, in the present medical system, doctors cannot effectively adjust the dose and variety of the medicine by monitoring the medicine taking history of the patient. In addition, since people can easily get prescription medicines, patent medicines, and nutrition supplements from pharmacies and hospitals, the misuse of the medicine is getting worse. Harm or even death can happen to patients because they do not take the medicine in the prescribed manner, leading to great displeasure for the family members.

At present, the health and safety department in the government and medical insurance companies have an urgent need for preventing the waste of medication products and ensuring that patients recover from their diseases by taking the medication. Moreover, an instant and accurate medical management method should be implemented for increasing the safety of medicine taking by people.

A few medication technologies used for dispensing medication are disclosed in several patents. The drug filling machine in U.S. Pat. No. 5,946,883 has a number of rotatable feeders containing different drugs. When dispensing, different drugs are withdrew from the feeders and collected together. The assembly of the drug filling machine is very complicated and used only by the hospitals and large-scale pharmacies.

The medication dispensing and monitoring system in U.S. Pat. No. 6,263,257 has a medication dispensing controller for controlling the dispensing of medication that is stored in the carriages. Each of the carriages has a rotating device used for dispensing the medication by pushing or rotating. Since the carriages and the rotating devices used for different medicines are manufactured according to the sizes and shapes of the medication, the medication dispensing and monitoring system has a high manufacturing cost and is inconvenient for users.

The automatic medication dispenser in U.S. Pat. No. 6,330,957 has a circular shaped and rotatable medication cassette with perpendicularly mounted fins extending radically from the center. When the fins rotate to a particular angle, the medicine is released from the cassette. However, a prescribed dose of medicine has to be put into the cassette manually, and the human errors and labor spent on dispensing medicine cannot be reduced.

The smart medicine container in US patent No. 20060124655 is capable of dispensing medicine automatically at prescribed times and alarming the patients via a local audio or visual alert after a dose of medicine has been dispensed. However, the medicine container can only be used for dispensing one variety of medicine. Also, it needs a two-stage transmission device and several sensors for detecting whether a dose has been dispensed or consumed. Therefore, the medicine container has a large volume, low dispensing speed, and is expensive to manufacture.

The automated pill dispenser in US patent No. 20060213921 has a number of pill chambers distributed in a rotatable circle about a hub. A vacuum tip withdraws a pill from the selected pill chamber and then moves the pill by gears, racks, etc. The structure of the pill dispenser is complicated and has to be fitted with many sensors for accurately controlling the position of the pill; therefore, its manufacturing cost is high.

SUMMARY OF THE INVENTION

It is therefore an object of the invention to provide a negative pressure type medication delivering device and medication dispensing device and system using the same. The automatic withdrawing, delivering, and releasing of the medication are achieved by applying negative pressure to a retractable tip element. Since the medication delivering device and medication dispensing device have simple structures and can be miniaturized, they are suitable for not only being used in families and pharmacies, but also the medication dispensing systems in hospitals and medication companies.

According to a first aspect of the present invention, a negative pressure type medication delivering device for taking away a pill from an outlet of a pill container is provided. The negative pressure type medication delivering device includes a delivering unit and a negative pressure unit. The delivering unit includes a cylinder, a retractable part, and a tip element. The cylinder has a first opening and a second opening. The retractable part connects to the cylinder. The tip element connects to the retractable part and has a first end, a second end and a channel. The first end passes through the first opening and is received within the cylinder. The second end is located at the outlet. The channel penetrates from the first end to the second end to link with the interior of the cylinder. The negative pressure unit connects to the second opening of the cylinder for providing negative pressure to the interior of the cylinder and the channel of the tip element, so that the tip element is capable of sucking up the pill on the outlet of the pill container.

According to a second aspect of the present invention, a medication dispensing device is provided. The medication dispensing device includes a plurality of pill containers, delivering units, a negative pressure unit, and a controlling unit. Each of the pill containers has an outlet for pills. Each of the delivering units corresponds to one of the pill containers and has a cylinder, a retractable part, and a tip element. The cylinder has a first opening and a second opening. The retractable part connects to the cylinder. The tip element connects to the retractable part and has a first end, a second end and a channel. The first end passes through the first opening and is received within the cylinder. The second end is located at the outlet. The channel penetrates from the first end to the second end to link with the interior of the cylinder. The negative pressure unit connects to the second opening of each cylinder of the delivering units. The controlling unit connects to the negative pressure unit for driving the same to selectively provide negative pressure to the interiors of the cylinders and the channels of the tip elements, so that the tip elements are capable of sucking up the pills on the outlets of the pill containers.

According to a third aspect of the present invention, a medication dispensing system is provided. The medication dispensing system includes a terminal server and at least one medication dispensing device as stated above. The terminal server is for receiving at least one prescription data. The controlling unit of the medication dispensing device connects to the terminal server for driving the negative pressure unit to cause the tip elements to withdraw the pills according to the prescription data.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 5A shows the side view of the medication dispensing device in

FIG. 4A;

DETAILED DESCRIPTION OF THE INVENTION

Figure 1A:
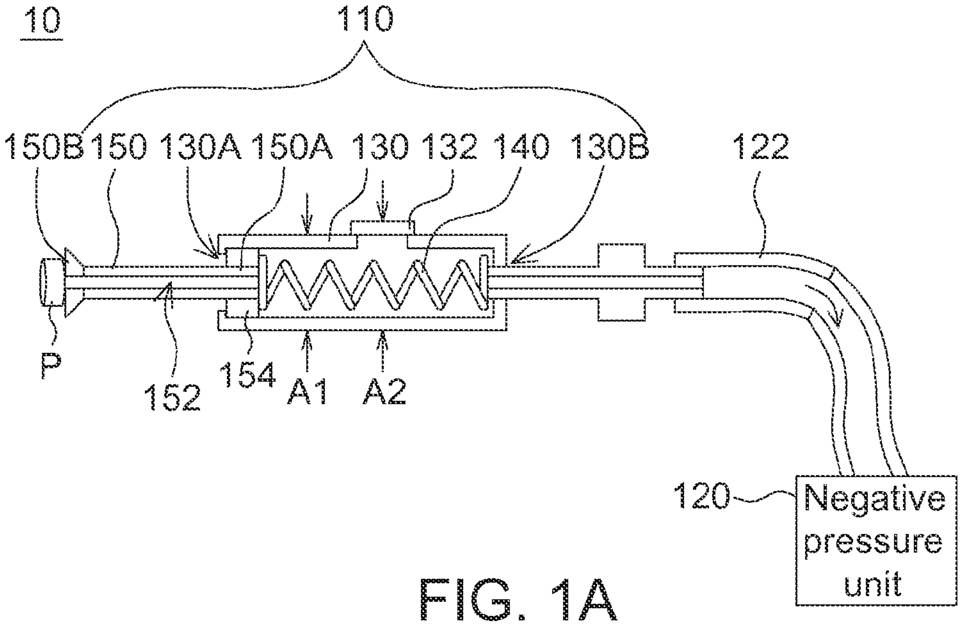
FIGS. 1A and 1B show a negative pressure type medication delivering device in motion according to an embodiment of the invention.
Figure 1B:
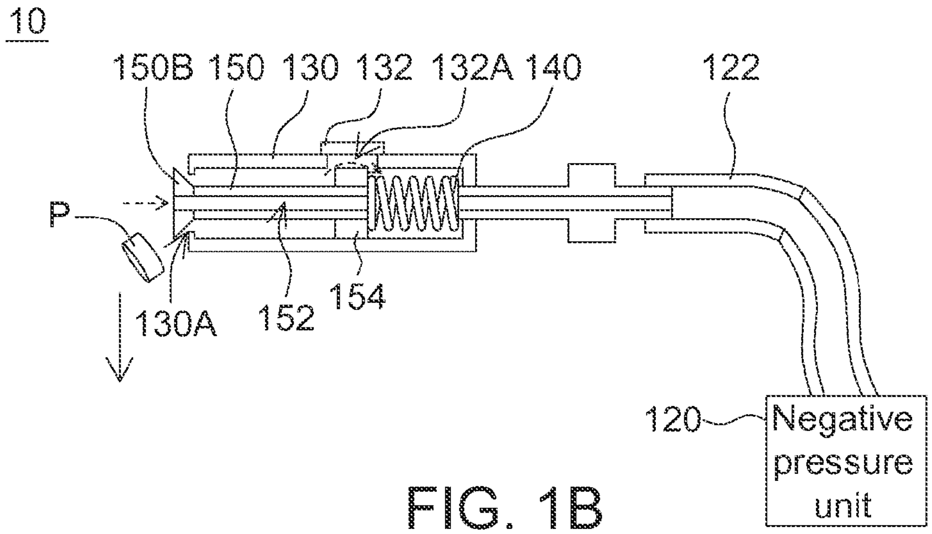

FIGS. 1A and 1B show a negative pressure type medication delivering device in motion according to an embodiment of the invention. The negative pressure type medication delivering device 10 includes a delivering unit 110 and a negative pressure unit 120. The delivering unit 110 includes a cylinder 130, a retractable part 140, and a tip element 150. The cylinder 130 has a first opening 130A, and a second opening 130B. The retractable part 140 connects to the cylinder 130. The tip element 150 connects to the retractable part 140 and has a first end 150A, a second end 150B, and a channel 152. The first end 150A passes through the first opening 130A and is received within the cylinder 130. The second end 150B is located at an outlet of a pill container (not shown). The channel 152 penetrates from the first end 150A to the second end 150B to link with the interior of the cylinder 130. The negative pressure unit 120 connects to the second opening 130B of the cylinder 130 for providing negative pressure to the interior of the cylinder 130 and the channel 152 of the tip element 150, so that the tip element 150 is capable of sucking up a pill P.

When the pill P is sucked up by the tip element 150, it disconnects the connection between the channel 152 and the exterior, so that the negative pressure in the cylinder 130 and the channel 152 increases, causing the tip element 150 to move from the first opening 130A to the second opening 130B and take away the pill P from the outlet.

Preferably, the tip element 150 has a piston 154 at its first end 150A, and at its second end 150B has a pill sucking end (also marked as 150B). The piston 154 makes a seamless contact with the inner wall of the cylinder 130 such that air cannot enter the cylinder 130 via the first opening 130A. The pill sucking end 1508 is for taking away the pill P from the outlet of the pill container. The cross-sectional area of the pill sucking end 150B is substantially equal to or larger than that of the outlet of the pill container, so that the pill sucking end 150B is capable of sealing the outlet. The functionality of the pill sucking end 150B will be elaborated with other figures later.

The retractable part 140 within the cylinder 130 has two ends that lean against, respectively, the piston 154 and the inner wall of the cylinder 130. The retractable part 140 is an elastic element, such as a sponge or a spring. When the elastic element is pressed, its force applied to the piston 154 is like a thrust on the piston 154. In the embodiment, the retractable part 140 is, for example, a spring; preferably, the retractable part 140 is a compression spring. The compression spring can be pre-pressed in the cylinder 130 and apply its force to the piston 154, such that the piston 154 will be positioned around the first opening 130A. Also, the retractable part 140 can be a bellows, which will be elaborated with figures later.

Figure 1C:
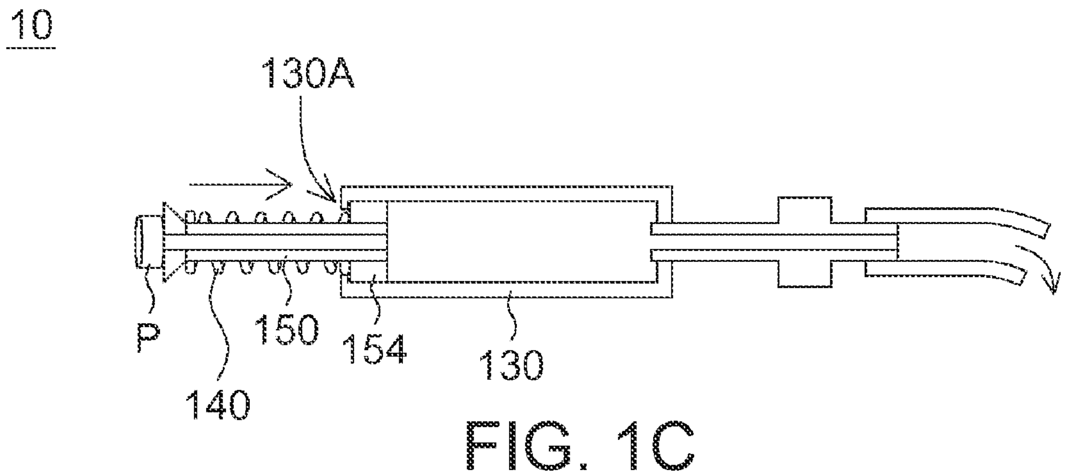
FIG. 1C shows a retractable part disposed outside the cylinder.

FIG. 1C shows a retractable part disposed outside the cylinder. The retractable part 140, such as a compression spring, is pre-pressed and on the periphery of the tip element 150. The piston 154 is positioned around the first opening 130A via the force of the retractable part 140.

In FIGS. 1A and 1B, the negative pressure unit 120 is, for example, a vacuum pump in the embodiment. The negative pressure unit 120 is connected to the second opening 130B of the cylinder 130 by a tube 122. When the negative pressure unit 120 is turned on, it starts to aspirate the air inside the cylinder 130 such that the pressure in the cylinder 130 and the channel 152 decreases. As the pressure decreases, a negative pressure is generated to cause the tip element 150 to suck up the pill P. As the pill P is sucked up by the pill sucking end 150B, it disconnects the connection between the interior of cylinder 130 and the channel 152 and the exterior, so that the negative pressure in the cylinder 130 and the channel 152 starts to increase and generate a vacuum-like effect. The increasing negative pressure in the cylinder 130 causes the tip element 150 to move toward the second opening 130B.

Preferably, the cylinder 130 has a pressure releasing part 132 for releasing the negative pressure inside the cylinder 130. When the first end 150A of the tip element 150 moves to the pressure releasing part 132, the interior of the cylinder 130 will link to the exterior to reduce the negative pressure inside the cylinder 130, and then the pill P will be released from the tip element 150. The radial cross-sectional area A2 on the pressure releasing part 132 of the cylinder 130 is larger than that A1 of the remaining portion of the cylinder 130. The cylinder 130 on the pressure releasing part 132 has a larger diameter, or part of the cylinder wall bulges out for having a larger cross-sectional area. Therefore, when the first end 150A of the tip element 150 moves to the pressure releasing part 132, a gap 132A is formed between the first end 150A and the inner wall of the cylinder 130. The interior of the cylinder 130 on the right side of the piston 154 links to the exterior via the gap 132A and the first opening 130A, so that the negative pressure starts to decrease. After the negative pressure is reduced, the tip element 150 cannot suck up the pill P any more, and the pill P drops from the tip element 150.

Since the interior of the cylinder 130 links to the exterior, the negative pressure in the cylinder 130 and the channel 152 of the tip element 150 disappears. Therefore, the elastic force of the retractable part 140 acts as a thrust to the piston 154, pushing the piston 154 back to the first opening 130A. The procedure including the steps of sucking, delivering and releasing a pill is completed herein.

Figure 1D:
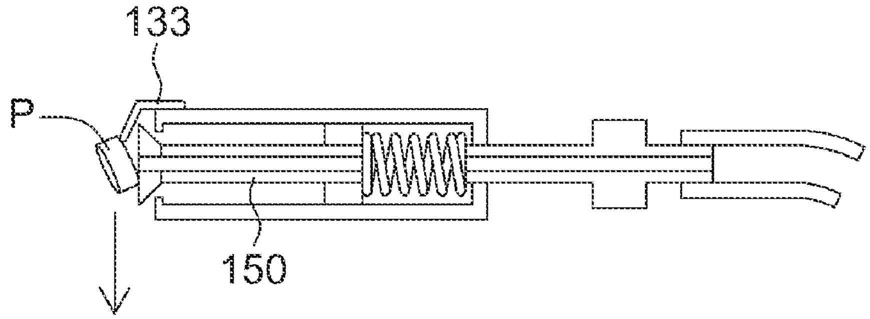
FIG. 1D shows a scraper removing a pill.

The manner of releasing a pill stated above makes use of the pressure releasing part 132 on the cylinder 130 in the embodiment; however, the negative pressure unit 120 can be switched off for releasing the negative pressure. In addition, other devices can be used to remove the pill P from the tip element 150. FIG. 1D shows a scraper removing a pill. After the pill P is taken away from a pill container and then positioned by the tip element 150, a scraper 133 removes the pill P from the tip element 150.

Figure 2:
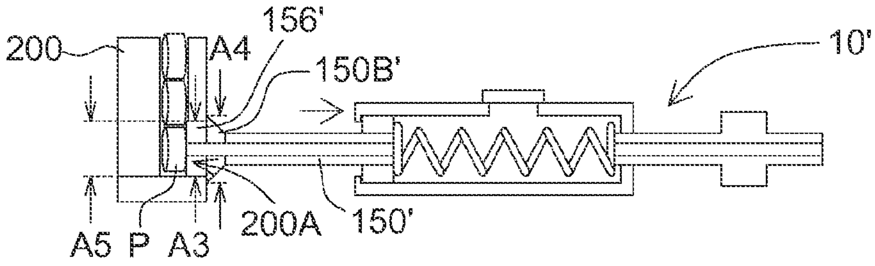
FIG. 2 shows part of a pill container and the medication delivering device.

FIG. 2 shows part of a pill container and the medication delivering device. The pill sucking end 150B' of the tip element 150' in the medication delivering device 10' has a cross-sectional area A4 that is larger than or equal to that A3 of the outlet 200A of the pill container 200 for covering the outlet 200A and preventing any moisture from entering the pill container 200 to cause the pill P to deteriorate. Also, the pill sucking end 150'B has an extension part 156 whose cross-sectional area A5 is smaller than that A3 of the outlet 200A for withdrawing the pill P more easily. The material of the pill sucking end 150'B and the extension part 156 can be deformable or elastic, so that the shape of the contact surface changes according to that of the pills to provide greater adhesion. Moreover, the material can be nontoxic, such as silica gel that has biocompatibility and is inert, and will not react with the pill.

Figure 3A:
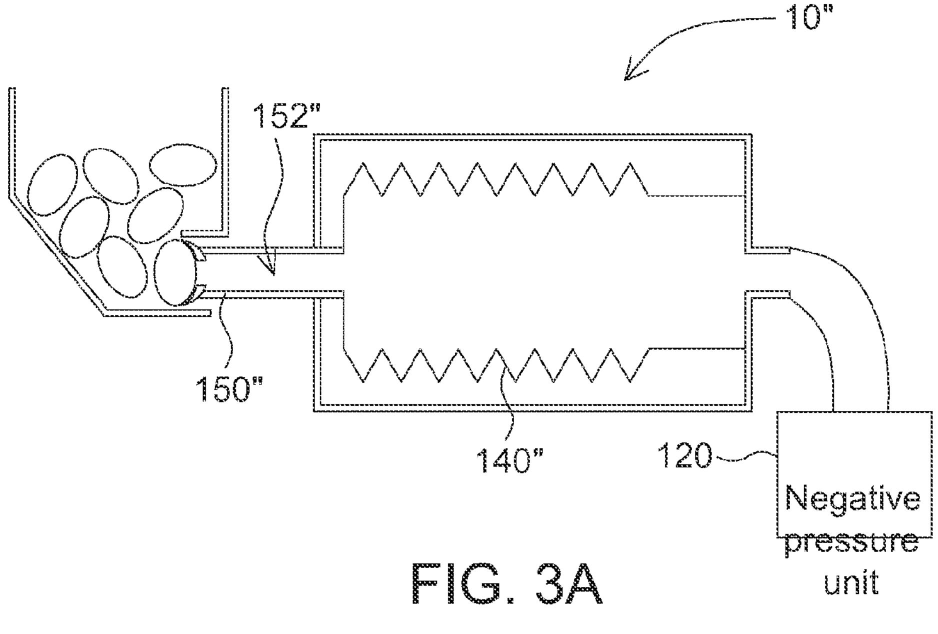
FIGS. 3A to 3C show a bellows functioning as the retractable part.
Figure 3B:
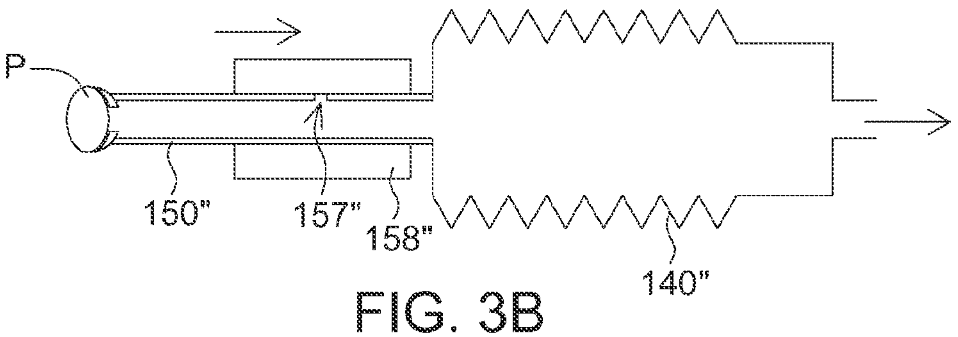
Figure 3C:
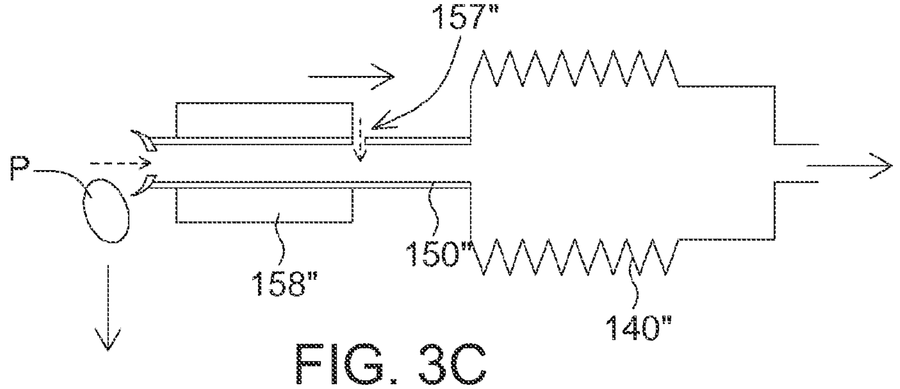

FIGS. 3A to 3C show a bellows functioning as the retractable part. In FIG. 3A, the retractable part 140" of the medication delivering device 10" is a bellows, which can be a plastic hollow pipe with cockle. The hollow tip element 150" connects to the retractable part 140" and their interiors link with each other. The negative pressure unit 120 provides negative pressure to the interior of the retractable part 140" and the channel 152", changing the amount of retraction so as to move the tip element 150". It is noted that the retractable part 140" and the tip element 150" can be formed as a whole, which is of low manufacturing cost and suitable for mass production. In FIG. 3B, the tip element 150" has a pressure releasing hole 157" and a fixed sleeve 158". The tip element 150" moves until the pressure releasing hole 157" is outside the fixed sleeve 158". At the same time, the interior of the retractable part 140" links to the exterior to reduce the negative pressure, thereby releasing the pill P as shown in FIG. 3C.

Figure 3D:
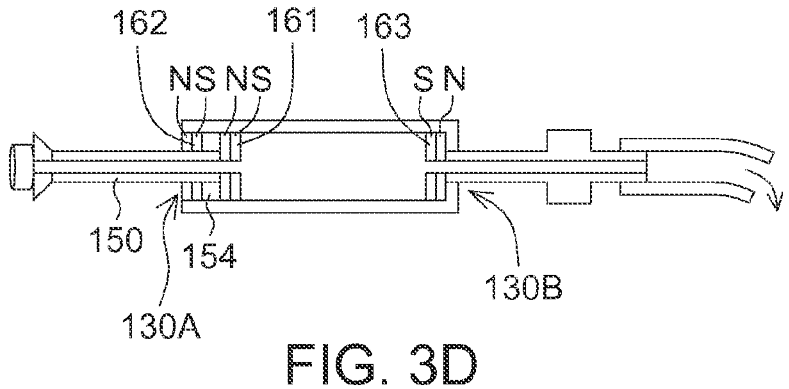
FIG. 3D shows the retractable part making use of magnetism.

As stated above, the tip element 150 and 150" return to the starting position through the elasticity of the retractable parts 140 and 140", but the invention is not limited thereto. A magnetic field can be used to retract the tip element as well. FIG. 3D shows the retractable part making use of magnetism. A first magnetic element 161, which is a magnet or a magnetized element, is disposed at the first end 150A of the tip element 150. A second magnetic element 162, which has the same magnetic field as the first magnetic element 161, is disposed on the cylinder 130 and near the first opening 130A. Since they have the same magnetic field strengths, the first and second magnetic elements 161 and 162 attract each other so that the tip element 150 is positioned in the first opening 130A. For moving the tip element 150, it only needs to overcome the magnetic attraction of the first and second magnetic elements 161 and 162. Moreover, a third magnetic element 163, which has the opposite magnetic field to the second magnetic element 161, is disposed on the cylinder 130 and near the second opening 130B. When the piston 154 is close to the second opening 130B, a repulsive force is generated due to the opposite magnetic field of the first and second magnetic elements 161 and 163. If the negative pressure is released at that time, the repulsive force pushes the tip element 150 back to the starting position.

Figure 4A:
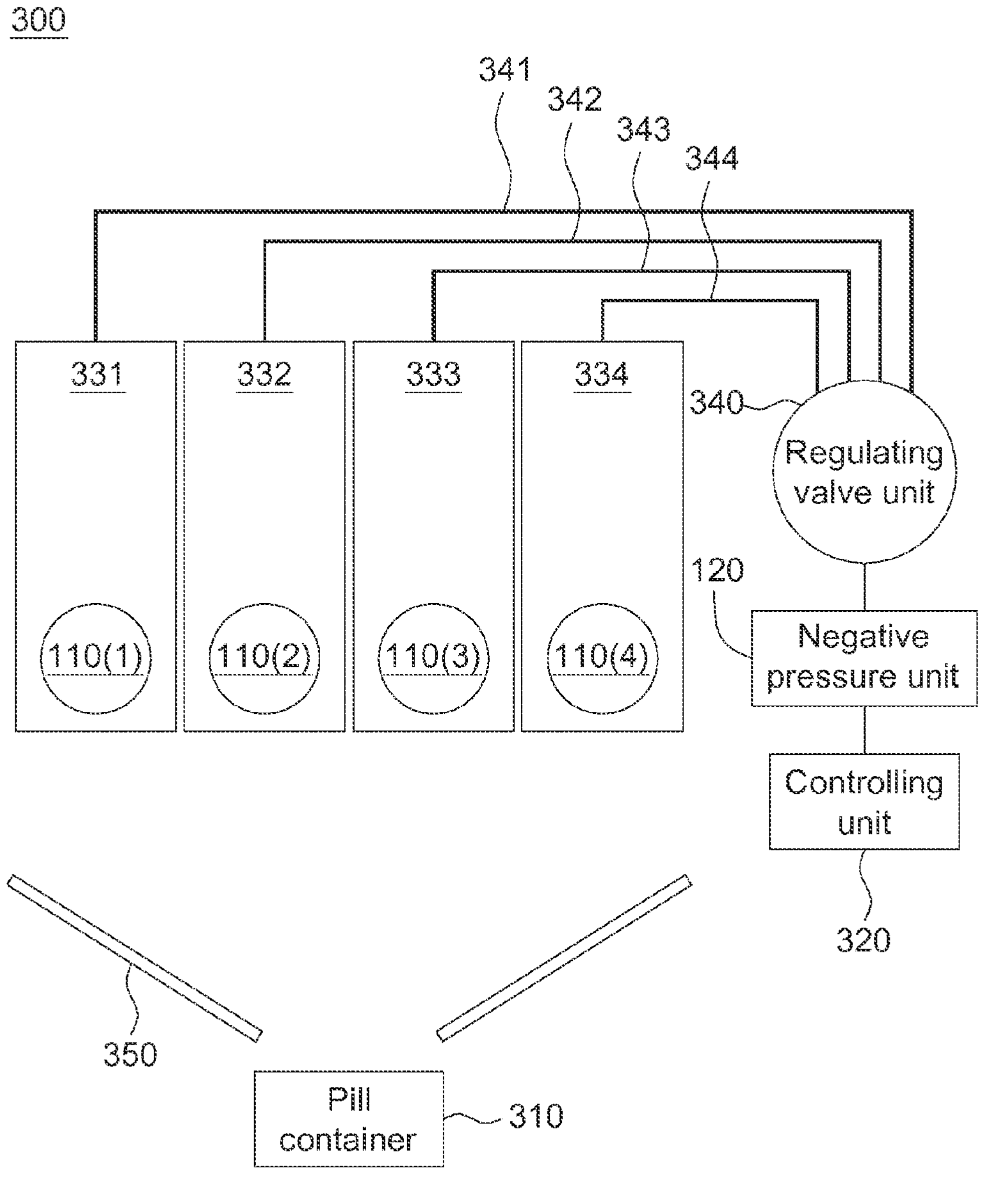
FIG. 4A shows an automatic medication dispensing device according to an embodiment of the invention.

FIG. 4A shows an automatic medication dispensing device according to an embodiment of the invention. The medication dispensing device 300 includes pill containers, delivering units, negative pressure unit 120, a pill collector 310 and a controlling unit 320. Four pill containers 331, 332, 333, and 334 and four delivering units 110(1), 110(2), 110(3) and 110(4) are used as an example. Each of the delivering units is disposed corresponding to the outlet of one pill container. The components of the delivering unit 100 and the characteristics thereof have been disclosed in the above description and figures.

The pill containers 331, 332, 333, and 334 are used for storing pills of different curvatures. The delivering units 110 (1), 110(2), 110(3) and 110(4) are for withdrawing different pills. The pill containers 331, 332, 333, and 334 can be built into the medication dispensing device 300. They can also be replaceable so that the users can replace the pill containers that have stored different pills according to their needs.

The medication dispensing device 300 further includes a regulating valve unit 340, which is connected to the negative pressure unit 120 and the cylinders of the delivering units 110(1), 110(2), 110(3) and 110(4) by the tubes 341, 342, 343, and 344. The regulating valve unit 340 is used for selectively opening passageways between the negative pressure unit 120 and the delivering units 110(1), 110(2), 110(3) and 110(4).

The controlling unit 320 is electrically connected to the negative pressure unit 120 and the regulating valve unit 340 for activating the same. The controlling unit 320 can be a programmable controller, which drives the regulating valve unit 340 to open or close its different valves, thereby connecting the negative pressure unit 120 to one or several delivering units to move the corresponding tip element(s).

The medication dispensing device 300 equipped with four pill containers 331, 332, 333, and 334 occupies a large region for the outlets of pills. In order to let the pills from different pill containers be collected in the pill collector 310, the medication dispensing device 300 has chutes 350 that are slanted to ensure that the pills enter the pill collector 310 by moving along the chutes 350. The pill collector 310 is, for example, a pillbox. After the pills are collected, the pillbox can be removed; afterwards, another medication dispensing procedure can be performed.

Figure 4B:
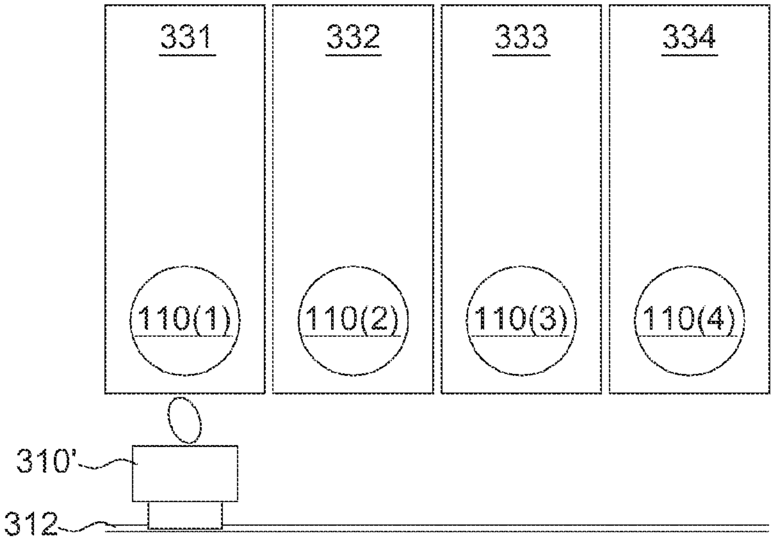
FIG. 4B shows the pill collector disposed on a movable platform.
Figure 4C:
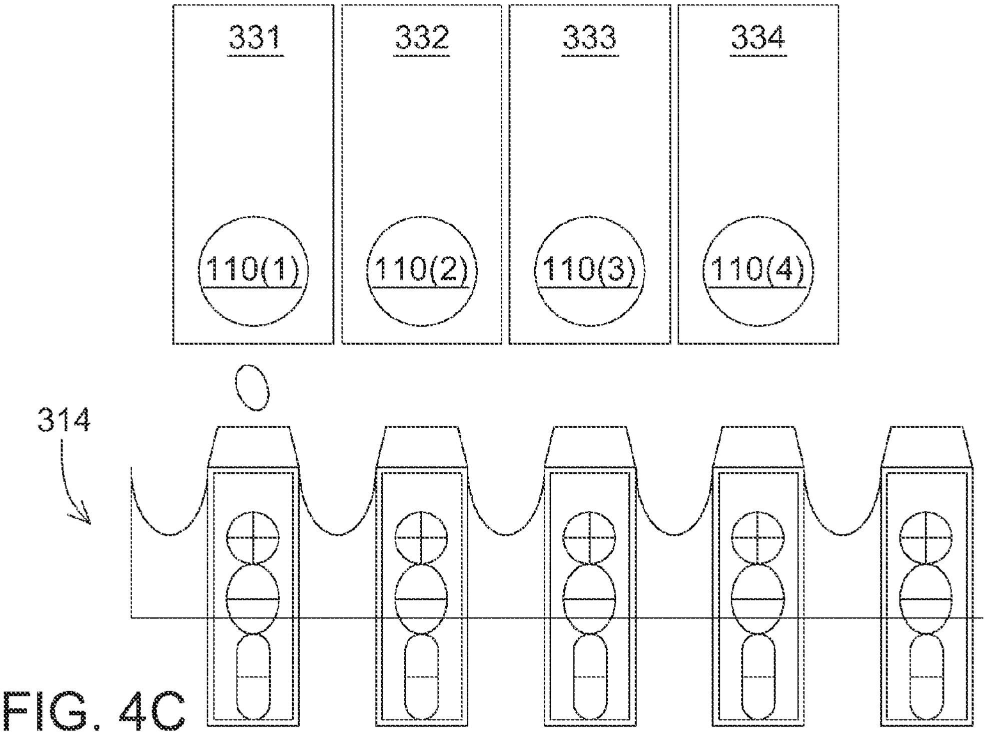
FIG. 4C shows the medication dispensing device having a continuous pill package.

FIG. 4B shows the pill collector disposed on a movable platform, and FIG. 4C shows the medication dispensing device having a continuous pill package. In FIG. 4B the pill collector 310' is capable of moving to any outlet of the pill containers 331, 332, 333, and 334 by using a movable platform 312 or a rotatable platform (not shown). In FIG. 4C the pill collector is a continuous pill package 314, which is capable of moving to the outlets of the pill containers 331, 332, 333, and 334 sequentially.

Figure 5A:
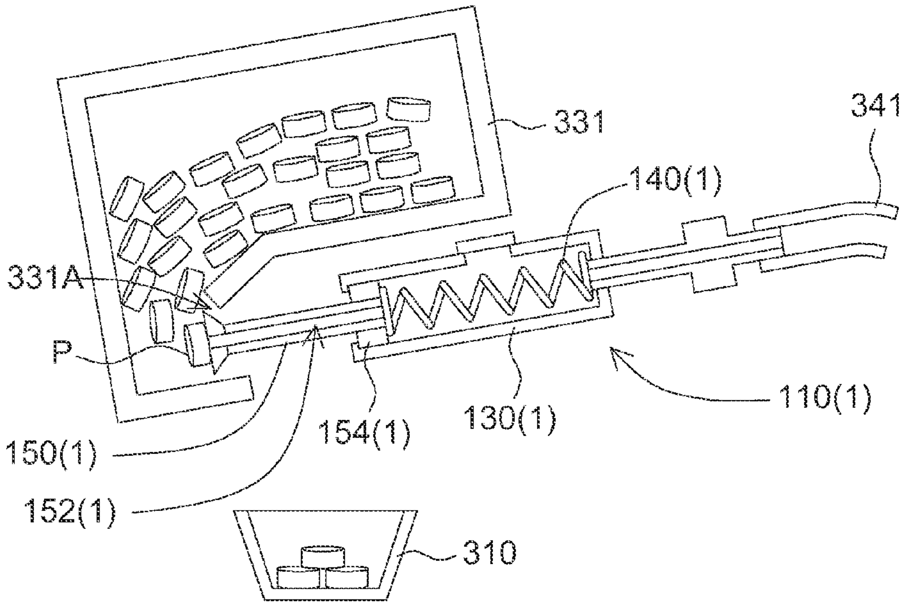

The pill containers 331, 332, 333, and 334 are cubes; preferably, they are slanted in the medication dispensing device 300 for guiding the pills to the outlets, so that the tip element can withdraw the pills more easily. FIG. 5A shows the side view of the medication dispensing device in FIG. 4A. Take the pill container 331 and its corresponding delivering unit 110(1) for example; the delivering unit 110(1) is slanted along with the pill container 331.

The medication dispensing device 300 has a base frame (not shown) for carrying the pill containers 331, 332, 333, and 334. Preferably, the base frame has a slope, and the pill containers 331, 332, 333, and 334 are disposed on the slope, thereby achieving the slanting purpose. However, the pill containers 331, 332, 333, and 334 are not necessary slanted as long as their shapes are changed. For example, the portion of the pill container around the outlet is funnel shaped or has a slanted part for automatically gliding the pills to the outlet.

Figure 5B:
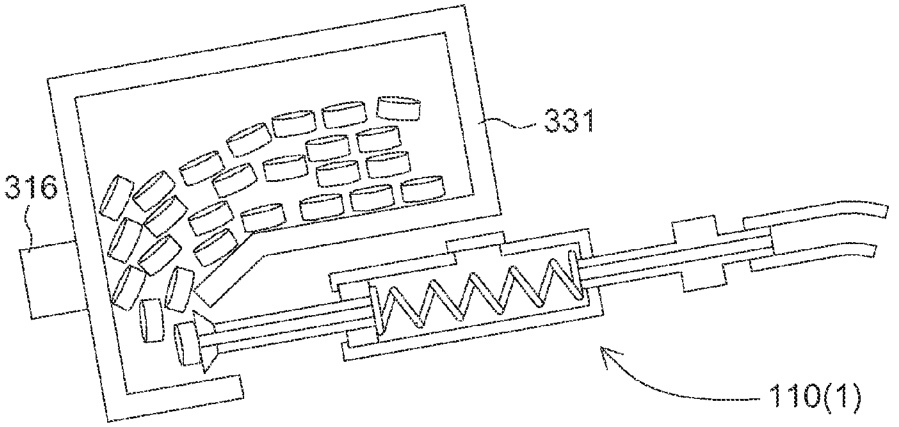
FIGS. 5B to 5D show the pill container having an auxiliary element for gathering the pills.
Figure 5C:
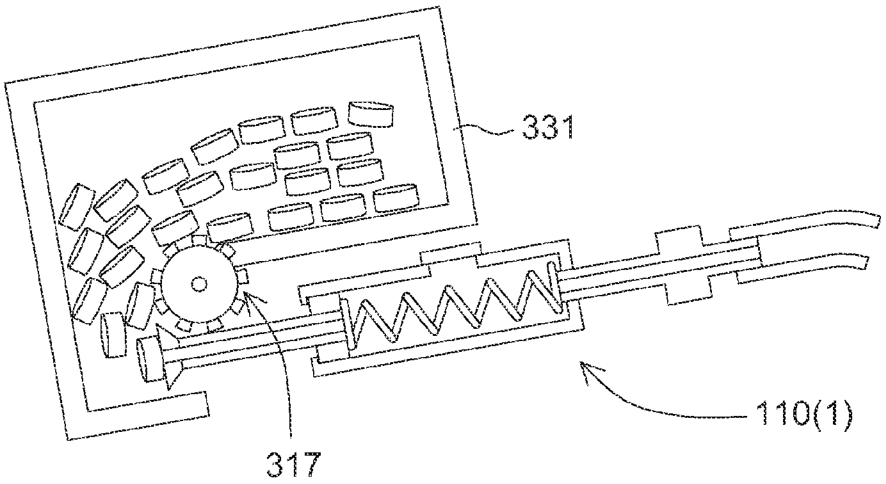
Figure 5D:
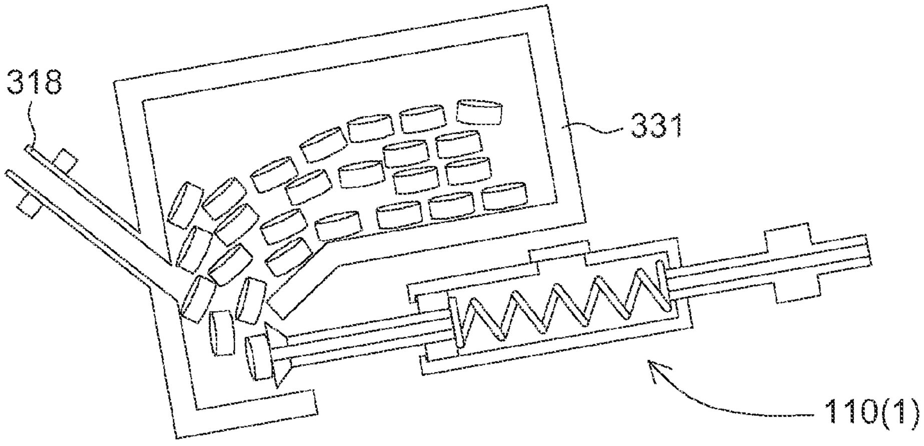

FIGS. 5B to 5D show the pill container having an auxiliary element for gathering the pills. In FIG. 5B, a vibrating unit 316 is used to help the pills to move. The vibrating unit 316 is connected to the controlling unit 320 (shown in FIG. 4A) and each of the pill containers 331, 332, 333, and 334. Preferably, the vibrating unit 316 is disposed under the pill containers or holds the pill containers with mechanical arms. When the controlling unit 320 outputs a signal for starting the medication dispensing procedure, the vibrating unit 316 moves the pill containers to gather the pills. In FIGS. 5C and 5D, a rotating unit 317 and a blowing unit 318 are used for gathering the pills.

Figure 6A:
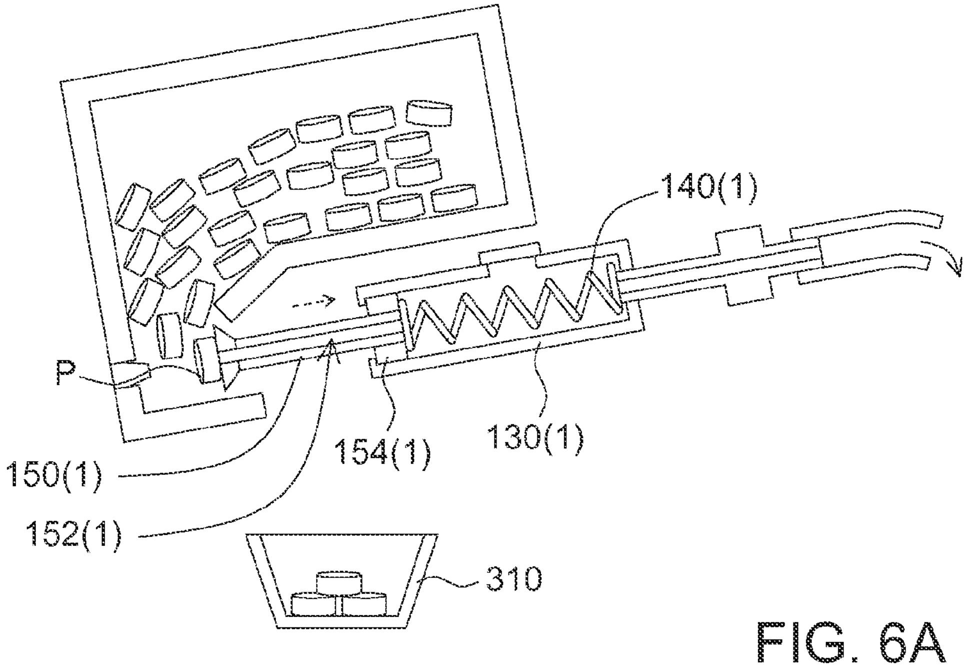
FIGS. 6A to 6C show the medication dispensing device in FIG. 5A in continuous motion.
Figure 6B:
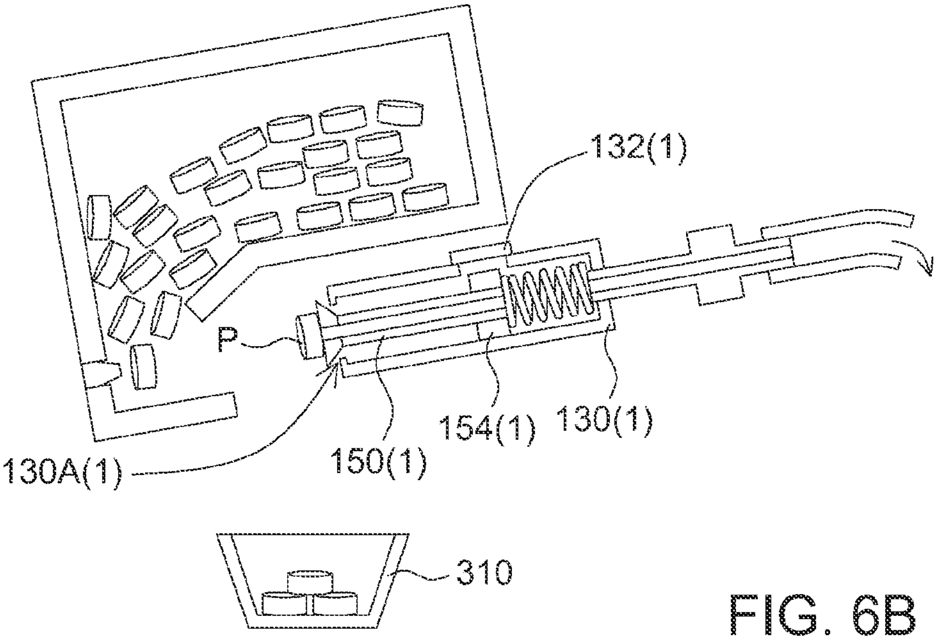
Figure 6C:
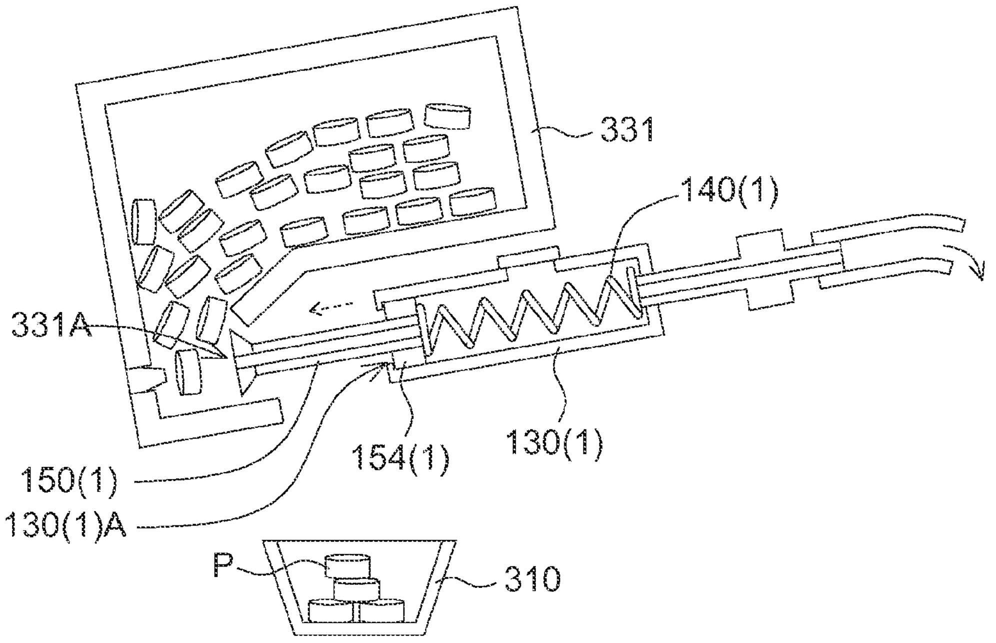

FIGS. 6A to 6C show the medication dispensing device in FIG. 5A in continuous motion. When the controlling unit 320 (shown in FIG. 4A) chooses to withdraw the pills from the pill container 331, it will actuate the negative pressure unit 120 and drive the regulating valve unit 340 to open the valve corresponding to the delivering unit 110(1). After opening the valve of the regulating valve unit 340, the negative pressure unit 120, the tube 314, the cylinder 130(1) and the channel 152(1) are connected. When the negative pressure unit 120 aspirates the air inside the cylinder 130(1), negative pressure is generated inside the cylinder 130(1), so that the tip element 150(1) sucks up the pill P in the outlet 331A as shown in FIG. 5A. The pill P sucked up by the tip element 150(1) disconnects the connection between the channel 152(1) and the exterior, increasing the negative pressure inside the cylinder 130(1) and the channel 152(1).

In FIG. 6A, when the negative pressure inside the cylinder 130(1) increases, the tip element 150(1) in the outlet 331A automatically retracts to take away the pill P. In the meantime, the piston 154(1) of the tip element 150(1) presses the retractable part 140(1) so that the compression length of the retractable part 140(1) increases.

The tip element 150(1) keeps moving until the piston 154 (1) is positioned in the pressure releasing part 132(1) as shown in FIG. 6B. At the same time a gap is formed between the inner wall of the cylinder 130(1) and the piston 154(1). In the meantime, the interior of the cylinder 130(1) at the right side of the piston 154 connects to the exterior via the gap and the first opening 130(1)A, reducing the negative pressure inside the cylinder 130(1) and dropping the pill P into the pill collector 310. The moving distance of the tip element 150(1) or the piston 154 is related to the locations of the pressure releasing part 132(1) and the pill collector 310.

As shown in FIG. 6C, after the pill P is dropped into the pill collector 310, and since the negative pressure has disappeared, the tip element 150(1) stops retracting. Therefore, the pressed retractable part 140(1), such as a compression spring, pushes the piston 154(1) back to the starting position (around the first opening 130(1)A) by the elastic force. Also, the tip element 150(1) returns to the outlet 331A of the pill container 331. The overall procedure of withdrawing a pill is completed herein.

By using of the pill containers 331, 332, 333, and 334, the delivering unit 110(1), 110(2), 110(3), and 110(4), the negative pressure unit 120, the controlling unit 320, and the regulating valve unit 340, the medication dispensing device 300 dispenses the pills automatically. Therefore, the medication dispensing device 300 is more effective and can prevent the users from touching the pills directly. Also, only one negative pressure unit 120 is employed to generate the negative pressure to move several tip elements at the same time, significantly simplifying the medication dispensing device 300. In addition, the moving distance of the tip elements is determined by the requirement for dropping the pill from a proper position into the pill collector; there is no need to control the position of the tip elements precisely and use additional sensors. The medication dispensing device 300 has a simple structure that is composed of fewer components to assemble, and allows a larger assembly tolerance.

The pills stored in the pill containers are not limited to prescription medicines; they can be patent medicines or nutritional supplements such as vitamins, minerals, and vegetation nutriments.

The medication dispensing device 300 that has a simple structure can be miniaturized to enhance its portability; therefore, it is very suitable for personal or family use. For example, if a user has to take particular pills regularly, he/she can put the pills into the medication dispensing device 300 for dispensing them into several packages. It is very convenient for him/her to carry the pills in the packages. In addition, he/she does not touch the pills while dispensing, preventing the pills from being contaminated. If a user has a habit of taking nutritional supplements, he/she also can use the medication dispensing device 300 to dispense the pills. The medication dispensing device 300 indeed provides the user with safety and convenience.

Figure 7:
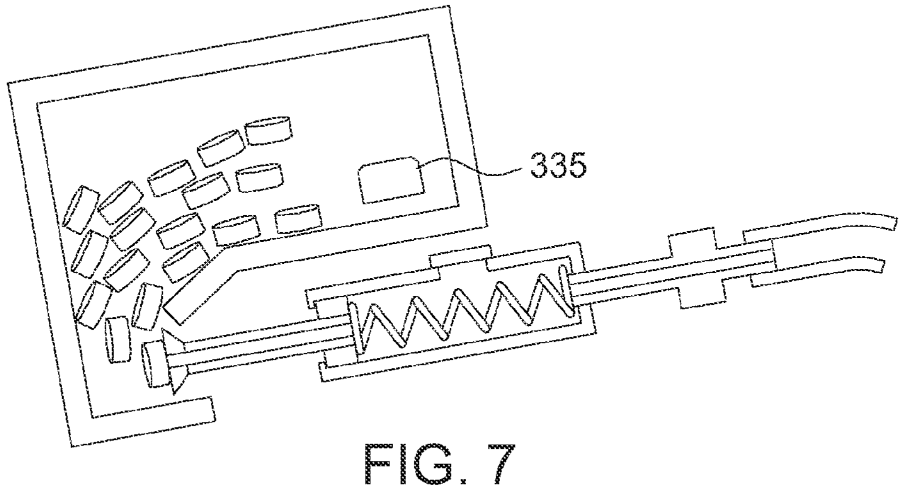
FIG. 7 shows the pill container having a medication content identification element.

The medication dispensing device 300 can be used in pharmacies as well. When the patient takes his/her prescription to a pharmacy, the pharmacist can use the medication dispensing device 300 to dispense pills according to the prescription paper. FIG. 7 shows the pill container having a medication content identification element. Medication companies can manufacture pill containers that already have the pills stored in them and have a medication content identification element 335 for the medication dispensing device 300. The identification element 335 can be a bar code, an identification chip, or a radio frequency identification (RFID) tag to assist with the dispensing procedure.

Moreover, the medication dispensing device 300 can be applied to any medication dispensing system in hospitals, large-scale pharmacies, and medication companies using a wired or wireless network. The medication dispensing system has a terminal server that is connected to the controlling unit 320 (shown in FIG. 4A) of the medication dispensing device 300. When the terminal server receives at least one prescription data for a patient, the controlling unit 320 actuates the negative pressure unit 120, causing different tip elements to withdraw different pills according to the prescription data, and gathering the pills in the pill collector 130, such as a pillbox.

The prescription date stated above includes the prescription information of the pill name, dose, and frequency of use. When diagnosing the disease of a patient, the doctor can input the prescription data to a computer system, and send the prescription data into the medication dispensing system of the hospital or clinic. After the terminal server receives and analyzes the information of the prescription data, it instructs its medication dispensing device to perform the dispensing procedure. The automatic medication dispensing function increases the dispensing efficiency and significantly reduces the labor.

The negative pressure type medication delivering device, the medication dispensing device and system using the same disclosed in the embodiment of the invention make use of negative air pressure to withdraw, move and release a pill sequentially, performing the dispensing procedure automatically. Due to the simple structures of the medication delivering device and the medication dispensing device, they can be miniaturized and suitable for mass production. In addition, they can be used in families, pharmacies, and medication dispensing system for providing the user with higher safety and convenience of taking medicine or nutritional supplements.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A negative pressure type medication delivering device for taking away a pill from an outlet of a pill container, comprising:

a delivering unit, including:

a cylinder, having a first opening and a second opening;

a retractable part, connecting to the cylinder; and a tip element, connecting to the retractable part and having a first end, a second end and a channel, wherein the first end passes through the first opening and is received within the cylinder, the second end is located at the outlet of the pill container, and the channel penetrates from the first end to the second end to link with an interior of the cylinder; and a negative pressure unit, connecting to the second opening of the cylinder for providing negative pressure to the interior of the cylinder and the channel of the tip element, so that the tip element being capable of sucking up the pill on the outlet of the pill container, wherein as the tip element moves from the first opening towards the second opening, a scraper contacts the pill on the tip element and the contact removes the pill from the tip element.

2. The medication delivering device according to claim 1, wherein the pill sucked up by the tip element disconnects a connection between the channel and an exterior, so that the negative pressure increases and causes the tip element to move from the first opening to the second opening and take away the pill from the outlet.

3. The medication delivering device according to claim 2, wherein as the tip element moves away from the outlet with the pill, the negative pressure unit is switched off to release the negative pressure, so that the pill is dropped from the tip element.

4. The medication delivering device according to claim 2, wherein the cylinder comprises a pressure releasing part, a radial cross-sectional area on the pressure releasing part of the cylinder is larger than that of the remaining portion of the cylinder, when the first end moves to the pressure releasing part, a gap is formed between the first end and an inner wall of the cylinder, so that the interior of the cylinder links to the exterior via the gap and the first opening to reduce the negative pressure.

5. The medication delivering device according to claim 1, wherein the tip element comprises a piston at the first end.

6. The medication delivering device according to claim 1, wherein the tip element comprises a pill sucking end at the second end, a cross-sectional area of the pill sucking end is substantially equal to or larger than that of the outlet of the pill container, and the pill sucking end comprises an extension part whose cross-sectional area is substantially smaller than that of the outlet of the pill container.

7. The medication delivering device according to claim 1, wherein the retractable part is a spring disposed within the cylinder or on a periphery of the tip element.

8. The medication delivering device according to claim 1, wherein the retractable part comprises at least one magnetic element for attracting or repelling the tip element, so that the tip element returns to a starting position in the cylinder.

9. A medication dispensing device, comprising:

a plurality of pill containers, wherein each of the pill containers has an outlet for pills;

a plurality of delivering unit, wherein each of the delivering units corresponds to one of the pill containers and comprises:

a cylinder, having a first opening and a second opening;

a retractable part, connecting to the cylinder; and a tip element, connecting to the retractable part and having a first end, a second end and a channel, wherein the first end passes through the first opening and is received within the cylinder, the second end is located at the outlet, and the channel penetrates from the first end to the second end to link with an interior of the cylinder;

a negative pressure unit, connecting to the second opening of each cylinder of the delivering units; and a controlling unit, connecting to the negative pressure unit for driving the same to selectively provide negative pressure to the interiors of the cylinders and the channels of the tip elements, so that the tip elements being capable of sucking up the pills on the outlets of the pill containers, wherein as the tip element moves from the first opening towards the second opening, a scraper contacts the pill on the tip element and the contact removes the pill from the tip element.

10. The medication dispensing device according to claim 9, wherein the pills sucked up by the tip elements disconnect a connection between the channels and an exterior, such that the negative pressure increases and causes the tip elements to move from the first openings to the second openings and take away the pills from the outlets, and the pills are dropped from the tip elements after the negative pressure is released.

11. The medication dispensing device according to claim 10, wherein the cylinder comprises a pressure releasing part, a radial cross-sectional area on the pressure releasing part of the cylinder is larger than that of the remaining portion of the cylinder, when the first end moves to the pressure releasing part, a gap is formed between the first end and an inner wall of the cylinder, so that the interior of the cylinder links to the exterior via the gap and the first opening to reduce the negative pressure.

12. The medication dispensing device according to claim 10, further comprising:

a pill collector, for collecting the pills;

a movable or rotatable platform, for moving the pill collector; and a continuous pill package, for receiving the pills.

13. The medication dispensing device according to claim 9, further comprising:

a vibrating, rotating or blowing unit, connecting to the controlling unit and each of the pill containers for selectively moving the pill containers.

14. The medication dispensing device according to claim 9, further comprising:

a base frame, for carrying the pill containers, wherein the pill containers are slanted by the base frame, and the delivering units are slanted corresponding to the pill containers.

15. The medication dispensing device according to claim 9, further comprising:

a regulating value unit, connecting to the controlling unit, the negative pressure unit, and the cylinders for selectively opening passageways between the negative pressure unit and the cylinders.

16. The medication dispensing device according to claim 9, wherein the tip element comprises a pill sucking end at the second end, a cross-sectional area of the pill sucking end is substantially equal to or larger than that of the outlet of the pill container, and the pill sucking end comprises an extension part whose cross-sectional area is substantially smaller than that of the outlet of the pill container.

17. The medication dispensing device according to claim 9, wherein the retractable part is a spring disposed within the cylinder or on the periphery of the tip element.

18. The medication dispensing device according to claim 9, wherein the retractable part comprises at least one magnetic element for attracting or repelling the tip element, so that the tip element returns to a starting position in the cylinder.

19. The medication dispensing system, comprising:

a terminal server, for receiving at least one prescription data; and at least one medication dispensing device of claim 9, wherein the controlling unit of the medication dispensing device connects to the terminal server for actuating the negative pressure unit to cause the tip elements to withdraw the pills according to the prescription data.

* * * * *